Sept. 10, 1940.  H. S. DAVIS  2,214,122
INCLINOMETER
Filed Dec. 21, 1939
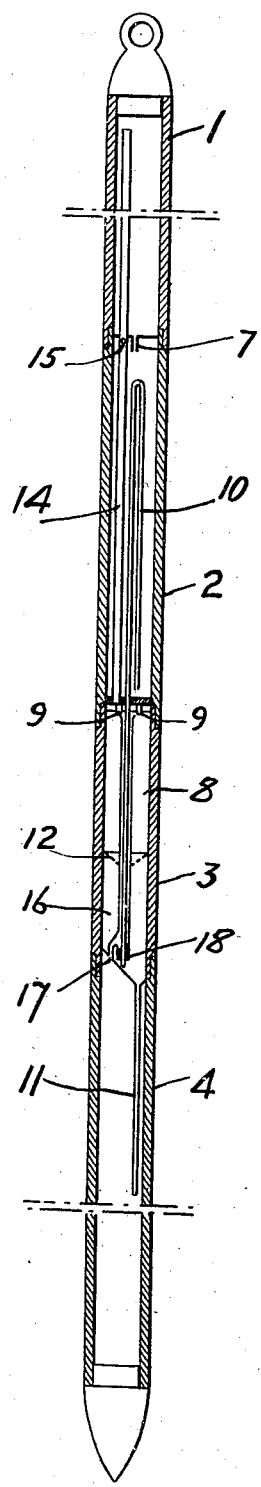
WITNESS:
INVENTOR
Harold S. Davis
BY
ATTORNEYS.

Patented Sept. 10, 1940

2,214,122

UNITED STATES PATENT OFFICE

2,214,122

INCLINOMETER

Harold S. Davis, Riverside, Conn., assignor to Sperry-Sun Well Surveying Company, Philadelphia, Pa., a corporation of Delaware Application December 21, 1939, Serial No. 310,296

5 Claims. (Cl. 33—205.6)

This invention relates to inclinometers for recording the deviation of bore holes from the vertical, by recording the position of a liquid surface with respect to the instrument, and aims to provide a more accurate, more simple and more rugged instrument than those previously used or proposed for this use.

This application is, in part, a continuation of my application Serial No. 189,609, filed February 9, 1938.

My invention relates to an instrument adapted to be lowered into a bore hole, and having provision for a liquid surface to be brought into contact with a recording surface or with a fresh place on the recording surface after an interval of time sufficient to permit the instrument to reach the desired location in the bore hole, and further having provision to remove the liquid surface from the place on the recording surface where the liquid surface has made a record. My patent No. 2,139,444, dated December 6, 1938, discloses an instrument of this general type, and one of the objects of this invention is to simplify such instrument and render it cheaper to construct.

Another object of the invention is to provide an instrument which, after the making of one record, may be prepared for the making of a subsequent record by its inversion, which permits the recording liquid to flow to a supply chamber without marring a record previously formed or a sheet placed in the instrument for the production of a subsequent record.

Further objects and advantages of this invention will appear from this specification and its drawing, wherein the invention is explained by reference to an illustrative embodiment.

The drawing comprises a diagrammatic view, mainly in vertical section, showing an instrument according to this invention.

The illustrated instrument includes four cylindrical members 1, 2, 3 and 4, suitably detachably jointed in any known manner, as by screw threads or the like, so that all together these members form a casing, which if desired can be enclosed in any suitable further protective casing.

Cylindrical member 3 defines a recording chamber in which the surface of a body of liquid, such as ink, water, or oil, makes a record on any suitable recording surface such, for example, as a sheet of plain or sensitized paper 8, detachably held therein by clips 9. Member 1 comprises a reservoir for the recording liquid. For timing the transfer of the liquid from reservoir 1 to the recording chamber, there is provided a continually open liquid-transfer means comprising a small liquid orifice 7, the cylindrical member 2, previously referred to, and a siphon 10 having its entrance near the bottom of cylindrical member 2 and having its longer lower leg disposed axially in recording chamber 3 with its exit end near the bottom of this chamber. By means of this restricted passage for the recording liquid, the liquid is caused to reach its recording position in the recording chamber 3 after a predetermined delay, so that the instrument can first reach the position in the bore hole where the record is to be made.

Between the recording chamber 3 and the lowermost chamber defined by cylindrical member 4, there is provided a continually open restricted tube 11 of small enough diameter to permit the liquid level to rise to the desired level in contact with the recording surface 8, but capable of slowly discharging the entire body of recording liquid into the lower chamber 4. Thus when the liquid is discharged into the recording chamber 3 it immediately begins to flow out through the restricted orifice 11, but at such a slow rate relative to its rate of entry that the upper surface of the liquid in chamber 3 rises into contact with the recording surface 8, and makes a record thereon. Then, upon further outflow of the liquid through orifice 11, the liquid level lowers until all the liquid has left the recording chamber.

Obviously the specific form of means for timing the transfer of liquid to the recording chamber may be varied, as for instance, by using the construction shown in my copending application referred to above. The important point to be observed is that the rate at which the liquid flows through the continually open orifice 11 shall be sufficiently less than the rate at which the liquid runs into the recording chamber, to permit the liquid surface to rise into contact with the recording surface.

A perforated diaphragm 12 may be positioned below the recording surface to prevent any accidental splashing of the liquid upon the recording surface, for example, in case the instrument were inadvertently withdrawn before the recording chamber is completely empty.

Preferably, the instrument is provided with means for equalizing the air pressures in the several chambers. For example, there is shown herewith an air tube 14, open at its bottom to the top of chamber 3, having a perforation 15 communicating with the top of chamber 2, and open at its upper end to the top of chamber 1.

Likewise, there is shown an air vent tube 16 axially located in the recording chamber 3 around the lower leg of the siphon tube 10 and in spaced relation thereto, this air vent tube being open at its upper end so as to communicate with the top of chamber 3, and communicating at its bottom with the lowermost chamber 4 through a restricted passage 17. This air vent tube 16 passes through the diaphragm 12 and is firmly held in place thereby.

It will be observed that in the region of the recording surface 8 there is (aside from the recording surface) only a single tube in contact with the surface of the recording liquid, namely, in the illustrated device, the axially disposed air vent tube 16 surrounding the axially disposed lower leg of the siphon 10, and occupying only a small proportion of the internal diameter of the recording chamber. Preferably, as shown, the external diameter of the air vent tube 16 is not over one-third of the internal diameter of the recording chamber, and in many instances can be considerably less, for example, one-fourth, one-fifth or even still less. This single tube is firmly held in place by the diaphragm 12. Thus, distortion of the flatness of the liquid level by surface tension effects is substantially minimized, there being in contact with the liquid at the recording level no irregular or unsymmetrical part, nor any part capable of deviating from an axial position in the recording chamber, but merely the symmetrically held small-diameter tube 16, and the record sheet 8. This construction, wherein distortion of the liquid surface is minimized, provides greater accuracy of records for a given diameter of instrument.

The lower leg of the siphon 10 passes through a water tight joint 18 in the air vent 16, into which it can be pushed when the instrument is assembled, and out of which it can be pulled when the instrument is taken apart, so that none of the parts in the recording chamber can become distorted.

The present invention further provides a continually open drain for the recording chamber 3 which will prevent any retention of the recording liquid on the bottom of this chamber.

The construction heretofore described also makes possible the rapid operation of the instrument without removing the liquid therefrom. After the liquid accumulates in the chamber 4, the instrument will be raised to the surface and opened to remove the record sheet 8. The record sheet chamber may then be cleaned and a new record sheet placed therein and the instrument again closed. It may be now restored to operative condition merely by its inversion, whereupon flow of liquid takes place in the following fashion:

The opening 17, which is somewhat restricted as compared with the diameter of the tube 14, permits the liquid to flow through the tube 16 into the top of the chamber 3, which is now its lower end. By having a restriction 17 sufficiently small compared with the diameter of the tube 14, little or no rise of liquid will occur in the inverted chamber 3, and consequently there will be no damage done to the new record sheet, the liquid flowing immediately through the tube 14 directly into the chamber 1. As this flow takes place venting occurs through the orifice 7, the siphon 10 and the tube 11. Liquid which was present in the chamber 2 as a result of the flow, thereinto after the preceding siphoning operation will flow through the opening 15 into the chamber 1, so that all of the liquid in the device will eventually find its way into this supply chamber. Upon restoring the instrument to upright position, the timed flow of liquid occurs to provide a normal cycle of operation. It will be evident that the instrument may be stored either in upright position directly following a recording operation or in inverted position after the return of the liquid to the chamber 1. The tube 11 is preferably elongated, as illustrated, to insure a prompt and smooth venting action during the reverse flow.

What I claim and desire to protect by Letters Patent is:

1. A device for recording inclination of a bore hole comprising a recording surface, a cylindrical container adapted to hold a body of liquid in position to contact with the recording surface, the recording surface being of cylindrical form and located in the upper part of said container, means for causing a timed admission of recording liquid into the said container, said means including a tubular inlet element extending down through the said container approximately in the longitudinal axis thereof and discharging near the bottom of said container, a lower chamber into which the recording liquid can be discharged from the recording chamber, an air vent comprising a tubular element axially disposed in the recording chamber around said tubular inlet element, the liquid surface in the region of the recording surface contacting only with the recording surface and with said axially disposed tubular air vent, whereby to minimize distortion of the free surface of the recording liquid.

2. A device for recording inclination of a bore hole comprising a recording surface, a cylindrical container adapted to hold a body of liquid in position to contact with the recording surface, the recording surface being of cylindrical form and located in the upper part of said container, means for causing a timed admission of recording liquid into the said container, said means including a tubular inlet element extending down through the said container approximately in the longitudinal axis thereof and discharging near the bottom of said container, a lower chamber into which the recording liquid can be discharged from the recording chamber, an air vent comprising a tubular element axially disposed in the recording chamber around said tubular inlet element, said tubular air vent element having an external diameter not greater than one third the internal diameter of the recording chamber, the liquid surface in the region of the recording surface contacting only with the recording surface and with said axially disposed tubular air vent, whereby to minimize distortion of the free surface of the recording liquid.

3. A device for recording inclination of a well bore comprising a reservoir for holding a record making liquid, a chamber in which a record is to be made, a chamber for receiving liquid from the record chamber following the formation of a record, means for controlling flow from the reservoir into the record chamber, and means for effecting return of the liquid from the receiving chamber to the reservoir upon inversion of the device.

4. A device for recording inclination of a well bore comprising a reservoir for holding a record making liquid, a chamber in which a record is to be made, a chamber for receiving liquid from the record chamber following the formation of a record, means for controlling flow from the reservoir into the record chamber, means for effecting return of the liquid from the receiving chamber to the reservoir upon inversion of the device, and for preventing the returning liquid from marring a record sheet in the record chamber.

5. A device for recording inclination of a well bore comprising a reservoir for holding a record making liquid, a chamber in which a record is to be made, a chamber for receiving liquid from the record chamber following the formation of a record, means for controlling flow from the reservoir into the record chamber, and means for effecting return of the liquid from the receiving chamber to the reservoir upon inversion of the device, said last means effecting venting of the chambers during flow of the liquid to make a record.

HAROLD S. DAVIS.